UNITED STATES PATENT OFFICE.

JOSEPH STEHLIN, OF NEW YORK, N. Y.

PROCESS OF PRODUCING STOCK FOOD.

1,037,357.  Specification of Letters Patent.  Patented Sept. 3, 1912.

No Drawing.  Application filed March 29, 1911. Serial No. 617,563.

*To all whom it may concern:*

Be it known that I, JOSEPH STEHLIN, a citizen of the United States of America, residing at Manhattan borough, city, county, and State of New York, have invented certain new and useful Improvements in Processes of Producing Stock Food, of which the following is a full, clear, and exact description.

My invention relates to a process for producing animal or stock food and has for its object to utilize what has heretofore been a waste product, so that same may become a valuable article of commerce for use as a nutritive food for cattle or other live stock.

In producing animal or stock food by my improved process, I utilize what are known as "spent" hops, that is to say, hops which have been used in breweries in the manufacture of malt liquors and which have heretofore, after such use, been a waste product and of little or no value commercially. Such waste or spent hops, after having gone through the brewing stages are in a highly saturated or moist condition; and in carrying out my invention, the spent hops are first placed in suitable presses to extract excess moisture, whereupon the spent hops are dried and partially cooked or steamed in suitable apparatus of well known construction, the drying being effected to such an extent that sufficient moisture is eliminated to avoid subsequent decomposition of the product. I find that drying to an extent whereby about eight per cent. moisture remains, is most satisfactory. After the drying has taken place, the stems of the spent hops are or may be eliminated therefrom, although the removal of the stems is not absolutely necessary. Thereupon the dried spent hops are ground or triturated into powder form, in which condition the product is suitable for use as animal or stock food. Before feeding live stock therewith, the aforesaid food is mixed with water or other suitable liquid.

Having now described my invention, what I claim and desire to secure by Letters Patent is:

1. The herein described process of producing live stock food, comprising first extracting excess moisture from spent hops, thereupon drying the same until about eight per cent. moisture remains, and then reducing the product to powder form.

2. The herein described process of producing stock food, comprising extracting excess moisture from spent hops, drying the same, removing the stems from the hops, and triturating the resultant product.

3. The herein described process of producing live stock food, comprising extracting excess moisture from spent hops, partially cooking and drying the same, and reducing the mass to powder form.

4. The herein described process of producing stock-food, comprising extracting moisture from spent hops, and partially cooking and drying the same.

5. The herein described process of producing stock food, consisting in first extracting excess moisture from moist spent hops, thereupon drying the same until about eight per cent. moisture remains, partially cooking and drying the same, and reducing the product to powder form.

Signed at New York city, N. Y., this 27th day of March, 1911.

JOSEPH STEHLIN.

Witnesses:
  DELBERT CURTIN,
  MAURICE BLOCK.

---

Copies of this patent may be obtained for five cents each, by addressing the "Commissioner of Patents, Washington, D. C."